No. 871,845. PATENTED NOV. 26, 1907
D. K. WILSON.
MANURE SPREADER.
APPLICATION FILED JUNE 25, 1907.

WITNESSES:
H. M. Harper
O. D. Young

INVENTOR
Dalton K. Wilson,
BY
G. C. Kennedy
ATTORNEY

UNITED STATES PATENT OFFICE.

DALTON K. WILSON, OF WATERLOO, IOWA, ASSIGNOR TO THE WILLIAM GALLOWAY COMPANY, OF WATERLOO, IOWA, A CORPORATION.

MANURE-SPREADER.

No. 871,845.

Specification of Letters Patent.

Patented Nov. 26, 1907.

Application filed June 25, 1907.

To all whom it may concern:

Be it known that I, DALTON K. WILSON, a citizen of the United States of America, and a resident of Waterloo, Blackhawk county, Iowa, have invented certain new and useful Improvements in Manure-Spreaders, of which the following is a specification My invention relates to improvements in manure spreaders, and the object of my invention is to provide means for raising and lowering the driving-sprocket-chain away from or into driving contact with the driving-sprocket-wheel. This object I have attained by the means which are hereinafter described and claimed, and which are illustrated in the accompanying drawing, in which:—

Figure 1:
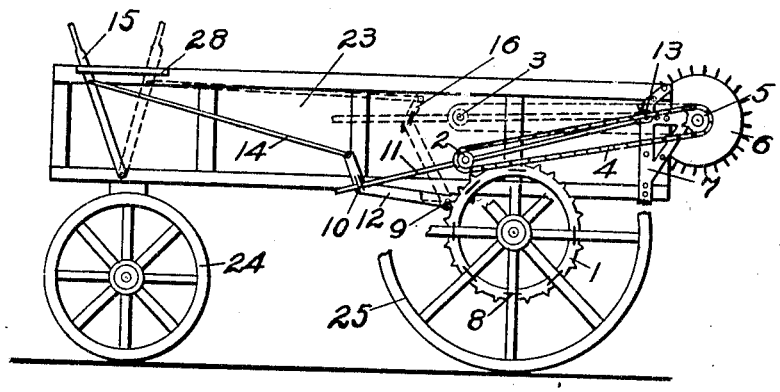
Figure 2:
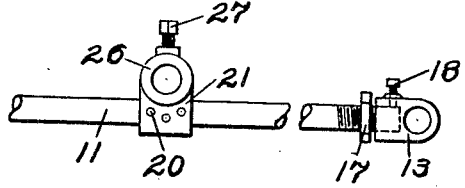
Figure 3:
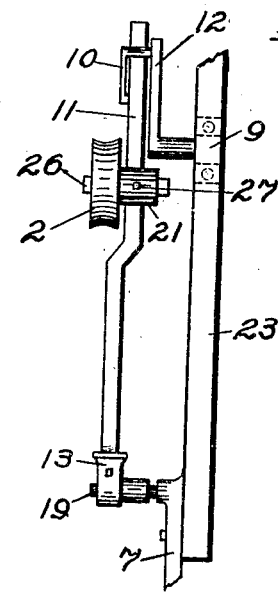

Figure 1 is a side elevation of a manure spreader, equipped with my invention; Fig. 2 is a detail view of one of the side-levers, and Fig. 3 is a detail plan view of the mounting of the sprocket-chain idler on said side-lever.

Similar numbers refer to similar parts throughout the several views.

I have shown in Fig. 1 a conventionalized representation of a manure spreader box 23 mounted on carrying wheels 24 and 25, and provided at the rear with a beater-drum 6 whose shaft is pivotally supported by a bracket 7 extending rearwardly from each side of said box The numeral 1 signifies a large sprocket-wheel fastened by the clamps 8 to the inside faces of the spokes of the drive-wheel 25. A sprocket-chain 4 is supported over the sprocket wheel 1, rotatable about the sprocket-wheel 5 on the end of the beater-drum shaft, and about the idler pulley 2. The idler 2 is rotatably mounted on a short shaft 26, the latter having its inner end mounted in a bearing-sleeve 21 which is secured to the side-lever 11 by bolts 20. The shaft 26 may be slidably adjusted within said sleeve, and then fixedly secured thereto by means of a set-screw 27. The side-lever 11 is threaded at its rear end to receive a nut 17, and a socket bearing 13. By the latter means a lengthwise adjustment is made possible to said side-lever, the nut 17 being a lock-nut, and the socket-bearing 13 being secured to the end of said lever by means of a set-screw 18. The socket-bearing 13 is pivoted on a stud-shaft 19 projecting from the bracket 7. The forward end of the side-lever 11 is attached within a loop 16 on the lever 12, the latter being fulcrumed on a pivot-shaft 9 secured to the under part of the wagon-box 23. The forward end of the lever 12 is turned upward and to it is pivoted the rear end of a connecting-rod 14, whose forward end is pivoted to the hand-lever 15, the latter being pivotally connected at its lower end to the box 23, and movable within a rack 22 arranged to limit its forward and back movements only.

As indicated by the full lines in Fig. 1, when the hand-lever 15 is in its forward position, the sprocket-chain 4 is lowered sufficiently to be in operative contact with the driving-sprocket-wheel 1, and as indicated by the dotted lines in same figure, when the hand-lever is in its rear position, said sprocket-chain is elevated from bearing contact with said driving-sprocket-wheel. The rotation of the beater-drum 6 may be thus controlled by this means, in starting or stopping it.

Having described my invention, what I claim as new, and desire to secure by Letters Patent, is:—

1. In a manure-spreader, the combination of a wagon-box supported on carrying-wheels, a beater-drum secured to a shaft rotatably supported at one end of said wagon-box, a driven sprocket-wheel secured to said shaft, a driving sprocket-wheel secured to one of the carrying-wheels, an idler-pulley bearing on a vertically-and horizontally-adjustable shaft, a sprocket-chain about said idler and said driven sprocket-wheel, and means for raising and lowering said idler and sprocket-chain out of and into operative engagement with said driving sprocket-wheel.

2. In a manure spreader, the combination of a wagon-box supported on carrying-wheels, a beater-drum secured to a shaft rotatably supported at one end of said wagon-box, a driven sprocket-wheel secured to said shaft, a driving sprocket-wheel secured to one of said carrying-wheels, a lever pivoted at one end to said wagon-box, a sleeve-bearing attached to said lever, a shaft horizontally adjustable in said sleeve-bearing, means for adjustably securing said shaft in said sleeve-bearing, an idler-pulley rotatable on said shaft, a sprocket-chain about said idler and said driven sprocket-wheel, and means for raising and lowering said lever to cause said sprocket-chain to be separated from or to enter into operative engagement with said driving sprocket-wheel.

Signed at Waterloo, Iowa, this 22nd day of June 1907.

DALTON K. WILSON.

Witnesses:
G. C. KENNEDY,
O. D. YOUNG.